United States Patent
Davis et al.

(10) Patent No.: US 8,442,684 B2
(45) Date of Patent: May 14, 2013

(54) INTEGRATED HIGH-SPEED TORQUE CONTROL SYSTEM FOR A ROBOTIC JOINT

(75) Inventors: Donald R. Davis, Brighton, MI (US);
Nicolaus A. Radford, League City, TX (US); Frank Noble Permenter, Webster, TX (US); Michael C. Valvo, League City, TX (US); R. Scott Askew, Houston, TX (US)

(73) Assignees: GM Global Technology Operations LLC, Detroit, MI (US); The United States of America as represented by the Administrator of the National Aeronautics and Space Administration, Washington, DC (US); Oceaneeering Space Systems, Webster, TX (US)

( * ) Notice: Subject to any disclaimer, the term of this patent is extended or adjusted under 35 U.S.C. 154(b) by 762 days.

(21) Appl. No.: 12/564,076

(22) Filed: Sep. 22, 2009

(65) Prior Publication Data

US 2011/0071680 A1    Mar. 24, 2011

(51) Int. Cl.
*G05B 19/00* (2006.01)
*G06F 13/00* (2006.01)
*G06F 1/16* (2006.01)
*H05K 7/20* (2006.01)
*H05K 1/14* (2006.01)
*H05K 1/00* (2006.01)
*G11B 15/18* (2006.01)
*G11B 21/02* (2006.01)
*G11B 5/596* (2006.01)
*G11B 5/48* (2006.01)
*H01R 24/00* (2011.01)

(52) U.S. Cl.
USPC . 700/261; 711/112; 361/679.33; 361/679.41; 361/715; 361/736; 361/748; 361/749; 361/750; 361/751; 361/752; G9B/5.188; G9B/19.007; G9B/19.008; G9B/19.009; G9B/25.003; G9B/33.024; G9B/33.049; 360/69; 360/75; 360/78.07; 360/245.9; 439/76.1; 439/660

(58) Field of Classification Search ... 700/261; 711/112; 361/736, 737, 679.33, 679.41, 715, 748–752; G9B/5.188, 19.007–19.009, 25.003, 33.024–33.028, G9B/33.049; 360/69, 75, 78.07, 245.9; 439/76.1, 439/660
See application file for complete search history.

(56) References Cited

U.S. PATENT DOCUMENTS 4,864,204 A * 9/1989 Daggett et al. ............ 318/568.2
4,925,312 A * 5/1990 Onaga et al. ................. 700/261

(Continued)

FOREIGN PATENT DOCUMENTS

JP    2001138273 A    5/2001
JP    2001239480 A    9/2001

(Continued)

OTHER PUBLICATIONS http://robotics.nasa.gov/courses/fall2002/event/oct1/NASA_Robotics_20021001.htm.

*Primary Examiner* — James Trammell
*Assistant Examiner* — Majdi Alsomiri
(74) *Attorney, Agent, or Firm* — Quinn Law Group, PLLC

(57) ABSTRACT

A control system for achieving high-speed torque for a joint of a robot includes a printed circuit board assembly (PCBA) having a collocated joint processor and high-speed communication bus. The PCBA may also include a power inverter module (PIM) and local sensor conditioning electronics (SCE) for processing sensor data from one or more motor position sensors. Torque control of a motor of the joint is provided via the PCBA as a high-speed torque loop. Each joint processor may be embedded within or collocated with the robotic joint being controlled. Collocation of the joint processor, PIM, and high-speed bus may increase noise immunity of the control system, and the localized processing of sensor data from the joint motor at the joint level may minimize bus cabling to and from each control node. The joint processor may include a field programmable gate array (FPGA).

19 Claims, 1 Drawing Sheet

U.S. PATENT DOCUMENTS

| | | | |
|---|---|---|---|
| 5,047,700 A * | 9/1991 | Szakaly | 318/568.1 |
| 6,226,566 B1 * | 5/2001 | Funda et al. | 700/263 |
| 7,042,175 B2 * | 5/2006 | Watanabe | 318/34 |
| 7,053,579 B2 * | 5/2006 | Moridaira | 318/568.12 |
| 7,061,200 B2 * | 6/2006 | Iribe | 318/568.16 |
| 7,348,746 B2 * | 3/2008 | Ogawa et al. | 318/568.12 |
| 7,646,161 B2 * | 1/2010 | Albu-Schaffer et al. | 318/568.2 |
| 2008/0247735 A1 * | 10/2008 | Kazanzides et al. | 388/815 |
| 2008/0258670 A1 * | 10/2008 | Yoshikawa | 318/568.22 |
| 2010/0016766 A1 * | 1/2010 | Zhang et al. | 601/5 |
| 2010/0312388 A1 * | 12/2010 | Jang et al. | 700/248 |

FOREIGN PATENT DOCUMENTS

| | | |
|---|---|---|
| JP | 2001296484 A | 10/2001 |
| JP | 2001322078 A | 11/2001 |
| JP | 2003516866 A | 5/2003 |
| JP | 2004167666 A | 6/2004 |
| JP | 2004351551 A | 12/2004 |
| JP | 2005088166 A | 4/2005 |
| JP | 2005102377 A | 4/2005 |
| JP | 2006000966 A | 1/2006 |
| JP | 2007007795 A | 1/2007 |

* cited by examiner

US 8,442,684 B2

INTEGRATED HIGH-SPEED TORQUE CONTROL SYSTEM FOR A ROBOTIC JOINT

STATEMENT REGARDING FEDERALLY SPONSORED RESEARCH OR DEVELOPMENT

This invention was made with government support under NASA Space Act Agreement number SAA-AT-07-003. The government may have certain rights in the invention.

TECHNICAL FIELD

The present invention relates to the control of a robot, and in particular to an electronic control system providing high-speed torque control of one or more robotic joints.

BACKGROUND OF THE INVENTION

Robots are automated or autonomous devices that are able to manipulate objects using a series of rigid links, which in turn are interconnected via articulations or motor-driven robotic joints. Each joint in a typical robot represents at least one independent control variable, also referred to as a degree of freedom (DOF). End-effectors are the particular links used for performing a task at hand, e.g., grasping a work tool or an object. Therefore, precise motion control of a robot may be organized by the level of task specification: object level control, which describes the ability to control the behavior of an object held in a single or cooperative grasp of a robot, end-effector control, and joint level control. Collectively, the various control levels cooperate to achieve the required robotic mobility, dexterity, and work task-related functionality.

Humanoid robots in particular are robots having an approximately human structure or appearance, whether a full body, a torso, and/or an appendage, with the structural complexity of the humanoid robot being largely dependent upon the nature of the work task being performed. The use of humanoid robots may be preferred where direct interaction is required with devices or systems that are specifically made for human use. Due to the wide spectrum of work tasks that may be expected of a humanoid robot, different control modes may be simultaneously required. For example, precise control must be applied within the different spaces noted above, as well as control over the applied torque or force, motion, and the various grasp types.

SUMMARY OF THE INVENTION

Accordingly, an electronic control system is provided for use with a robot. The control system establishes a high-speed torque control loop for a robotic joint having one or more electric motors and, as needed, a gear reduction assembly. Within the scope of the present invention, the control system includes a dedicated, programmable logic device or joint processor in the form of a printed circuit board assembly (PCBA) that is collocated with and/or embedded within a robotic joint to control the torque output of the motor(s) or actuator(s) driving that particular robotic joint. In one embodiment, the joint processor may include one or more field-programmable gate array (FPGA)-based processors, e.g., 300 MHz processors in one embodiment, in order to optimize overall programming flexibility, however the joint processor is not so limited.

Additionally, the PCBA contains a power inverter module (PIM), a high-speed communication bus, and local sensor conditioning electronics (SCE), as well as sufficient memory for processing and executing the various control algorithms that exercise precise motion control over the robot. All of these elements are collocated on a single PCBA as described below. The PCBA has a high power density, e.g., approximately 130 W/in$^2$ to approximately 400 W/in$^2$ according to one embodiment. A high-speed torque control loop is thus provided, which may be approximately 10 KHz to approximately 30 KHz according to one embodiment, or otherwise sufficient for ensuring precise feedback control of the motor embedded in the robotic joint.

The robotic control circuit may be fully integrated into a single PCBA in order to realize a significant reduction in required packaging space, along with providing increased noise immunity and minimization of required connectors and cabling. The high-speed communication bus may have bit transfer rates of approximately 50 MHz to approximately 100 MHz, for example, and may be configured as a multi-drop high-speed communication bus device affording sufficiently decreased latency, i.e., decreasing the delay associated with transferring a packet of information or data to a particular destination, thereby ensuring optimal robustness of the control system while allowing future expansion thereof into existing and evolving control strategies.

To maximize the frequency of the motor torque control loop, certain processing functions may be separated from any required joint coordination control. The joint-level control is executed by the joint processors embedded within the robot at or in close proximity to the robotic joint(s) being controlled. The joint processors enable a high-speed torque feedback loop which commands a motor current as opposed to a voltage source command furnished to the joint motor in a more conventional manner. Motor torque commands and joint sensor data may be processed and filtered at the joint level using the dedicated joint processor collocated with or embedded in a given robotic joint.

In one embodiment, a joint processor may be dedicated to each DOF, i.e., a joint having two DOF may have a pair of joint processors. In another embodiment, multiple DOF may be controlled by a single PCBA, provided some of the required circuitry is duplicated. As noted above, the PIM may also be collocated with the joint processor on the PCBA. As a result, localized or joint-level processing of motor sensory data is provided aboard the PCBA, which helps to minimize the amount of bus cabling required to and from each control node, and reduces the amount of electro-magnetic interference that would corrupt the data.

In particular, the control system has a plurality of motor-driven joints each driven by at least one dedicated joint motor or other actuator. The control system includes a higher-level control circuit or brainstem for coordinating the motion of the various joints, and a plurality of the embedded PCBA noted above. The PCBA embodying the joint controller may include one or more joint processors and a high-speed bus providing a calibrated rate of data transfer between the PCBA and the brainstem. The PCBA controls the torque output of the joint motor using a high-speed feedback torque control loop, which is at least approximately 10 KHz according to a particular embodiment. The higher-level control circuit provides both Cartesian control or control in the Cartesian space, and impedance-based control of the humanoid robot, without also controlling the torque output of the joint motor.

A joint controller in the form of a PCBA is provided for controlling the torque output of a motor-driven joint of a robot. The robot may be configured as a humanoid robot or other suitable robot design, and includes a high-level control circuit providing both Cartesian control and impedance-based control of the robot without controlling the torque output of the motor. The PCBA includes a joint processor and a high-speed serialized bus providing a calibrated rate of data transfer between the PCBA the high-level control circuit. The PCBA provides feedback-based torque control of the joint motor in a control loop of at least approximately 10 KHz.

A robot includes a plurality of robotic joints each being driven by at least one corresponding joint motor or actuator, and a control system having a high-level control circuit and the PCBA as set forth above. The PCBA includes a processor and a high-speed bus, and may include a PIM and sensor conditioning electronics (SCE) for processing analog signals from various motor sensors. The high-speed bus provides a calibrated rate of data transfer between the PCBA and the high-level control circuit. The PCBA is adapted for controlling a torque output of the joint motor using a feedback control loop of at least approximately 10 KHz, while the high-level control circuit provides both Cartesian control and impedance-based control of the robot without also controlling the torque output.

The above features and advantages and other features and advantages of the present invention are readily apparent from the following detailed description of the best modes for carrying out the invention when taken in connection with the accompanying drawings.

DESCRIPTION OF THE PREFERRED EMBODIMENT

Figure 1:
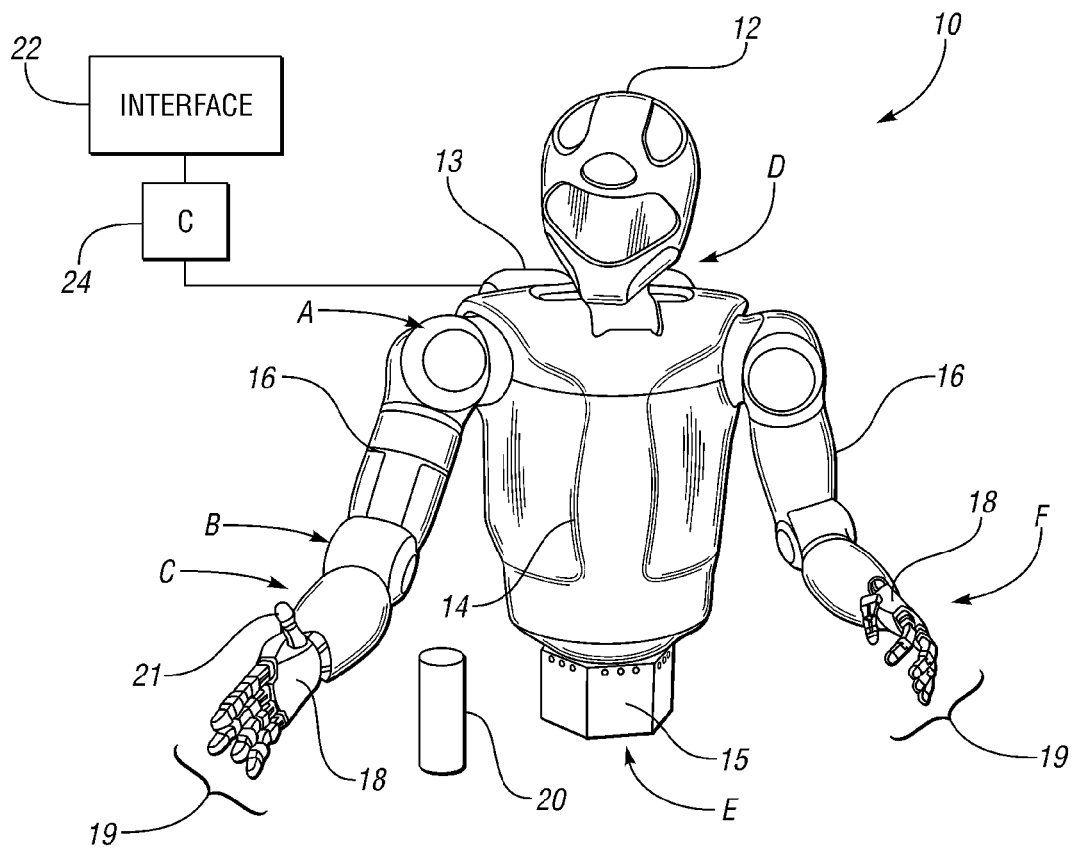
FIG. 1 is a schematic illustration of a robot.

With reference to the drawings, wherein like reference numbers refer to the same or similar components throughout the several views, FIG. 1 shows a dexterous robot 10 adapted to perform one or more tasks with multiple degrees of freedom (DOF). According to one embodiment, the robot 10 is configured as a humanoid robot as shown with a plurality of independently and interdependently-moveable robotic joints, such as but not limited to a shoulder joint (arrow A), an elbow joint (arrow B), a wrist joint (arrow C), a neck joint (arrow D), and a waist joint (arrow E), as well as the various finger joints (arrow F) positioned between the phalanges of each robotic finger 19.

The robot 10 may include a head 12, torso 14, waist 15, arms 16, hands 18, fingers 19, and thumbs 21, with the various joints noted above being disposed within or therebetween. The robot 10 may also include a task-suitable fixture or base (not shown) such as legs, treads, or another moveable or fixed base depending on the particular application or intended use of the robot. A power supply 13 may be integrally mounted to the robot 10, e.g., a rechargeable battery pack carried or worn on the back of the torso 14 or another suitable energy supply, to provide sufficient electrical energy to the various joints for movement of the same.

Each robotic joint may have one or more DOF. For example, certain joints such as the shoulder joint (arrow A) and elbow joint (arrow B) may have at least two DOF in the form of pitch and roll. Likewise, the neck joint (arrow D) may have at least three DOF, while the waist and wrist (arrows E and C, respectively) may have one or more DOF. Depending on task complexity, the robot 10 may move with over 40 DOF. Although not shown in FIG. 1 for simplicity, each robotic joint contains and is driven by one or more actuators, e.g., joint motors, linear actuators, rotary actuators, and the like.

A distributed control system (C) 24 provides precise motion control of the robot 10, including control over the fine and gross movements or manipulations of an object 20 that may be grasped by the fingers 19 and thumb 21 of one or more hands 18. The control system 24 may control each joint in isolation from the other joints, or may coordinate the actions of multiple joints in performing complex work tasks.

The control system 24 may include multiple digital computers or data processing devices each having one or more microprocessors or central processing units (CPU), read only memory (ROM), random access memory (RAM), electrically-erasable programmable read only memory (EEPROM), a high-speed clock, analog-to-digital (A/D) circuitry, digital-to-analog (D/A) circuitry, and any required input/output (I/O) circuitry and devices, as well as signal conditioning and buffer electronics. Individual control algorithms resident in the control system 24 or readily accessible thereby may be stored in ROM and automatically executed at one or more different control levels to provide the respective control functionality.

Still referring to FIG. 1, the control system 24 may include a user interface 22 providing a user with intuitive programming or operational access to the robot 10. For example, the user interface 22 may include a graphical user interface (GUI) providing an operator with an intuitive or menu-driven set of functional options for limited control over the robot 10. The user interface 22 may also include a restricted interface providing programming access to the robot 10 by engineers, programmers, or other restricted personnel having the authority to alter the core control code of the robot.

Figure 2:
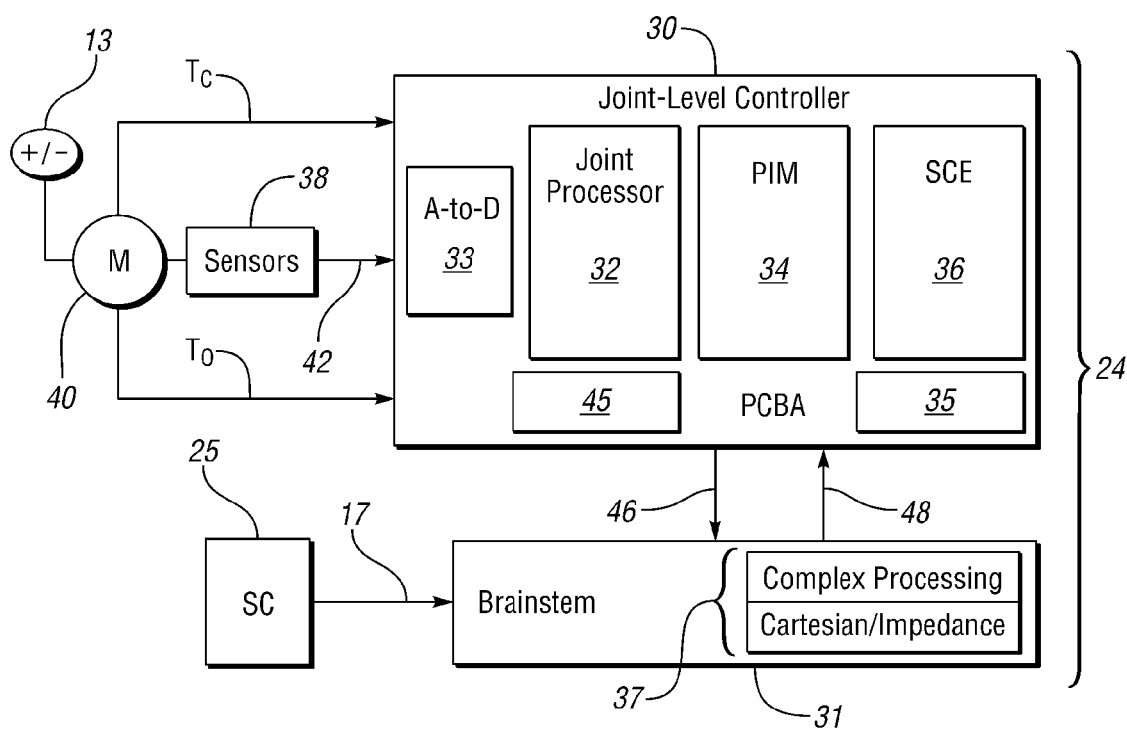
FIG. 2 is schematic illustration of an electronic control system that is usable with the robot shown in FIG. 1.

Referring to FIG. 2, the control system 24 for precise torque control of a joint motor (M) 40 or other joint-level actuator includes a plurality of joint-level controllers, each in the form of a printed circuit board assembly (PCBA) 30. For simplicity, only one PCBA 30 is shown in FIG. 2, however as noted above the robot 10 of FIG. 1 will include a plurality of PCBA, with each PCBA dedicated to control of one or more DOF depending on the particular configuration. For example, some joints may utilize a single motor or actuator, e.g., a shoulder roll joint, or multiple motors for DOF that are linked, or a wrist joint using two motors to provide 2 DOF, with while others, such as tendon-driven joints of the fingers 19 or thumb 21, may require more than one motor or actuator per DOF. As flexible tendons cannot be pushed, a tendon-driven joint must be pulled open and closed, thus lending itself to the use of multiple joint motors.

The control system 24 also includes a control circuit 31, which may be physically embedded within the robot 10 shown in FIG. 1 or a separate device. The circuit 31 is labeled "brainstem" in FIG. 2 to differentiate its function relative to that of each PCBA 30. Within the scope of the present invention, the control circuit 31 receives task-based control input signals (arrow 17) from a top-level controller or system commander (SC) 25. In response to the control input signals (arrow 17), the brainstem or control circuit 31 determines which joint or combination of joints to activate to execute the required action or task. The control circuit 31 coordinates the motion of the joints required for executing the task, using various algorithms 37, e.g., Cartesian control, joint and end-effector level impedance-based control, etc. Actual sensory processing, conditioning, filtering, and torque determination is processed locally at the joint level using the plurality of PCBA 30, and calculated values are sent to the control circuit 31 as a set of joint signals (arrow 46).

As will be understood by those of ordinary skill in the art, a PCBA is a generally rigid multi-layered circuit board securing and interconnecting various chips and other electronic transmission and processing components, including but not limited to those set forth in detail below. Proper circuit board fabrication techniques are known in the art, and fully consider the use of thermal layers as well as the spacing and interconnectivity of the required power and ground planes between each signal layer. Such techniques become especially important when consolidating a multitude of processing elements on a single PCBA, as shown in FIG. 2.

The PCBA 30 of the present invention is placed in high-speed serialized communication with the control circuit 31. The PCBA 30 provides low-level motion control of a corresponding joint or closely-positioned joints of the robot 10 of FIG. 1, specifically by using localized feedback control of the torque output of a given joint motor 40. As the name implies, a joint motor 40 may be positioned within each robotic joint (e.g., arrows A-F of FIG. 1) and energized by the PCBA 30 to thereby generate the required motor torque and resultant motion of the corresponding robotic joint. According to one embodiment, the power supply 13, which provided power to the PCBA 30, is a 96V/40 A direct current (DC) device, although other power supplies may also be used without departing from the intended scope of the invention.

The brainstem or control circuit 31 uses the CPU 37 to provide required high-level controls, i.e., complex data processing functionality, Cartesian positioning, and/or any impedance-based motion control of the robot 10 of FIG. 1. The configuration and positioning of the PCBA 30 and its serialized data communication with the high-level control circuit 31 thus provides relatively high-speed precision torque control of the joint motor 40, as well as over any gear reduction assembly required within a given robotic joint.

Aboard the PCBA 30, a joint processor 32 is collocated with a power inverter module (PIM) 34, memory 45, sensor conditioning electronics (SCE) 36, and a high-speed serialized communication bus 35 for providing increased electronics packaging efficiency as well as increased noise immunity. For example, the joint processor 32, the PIM 34, and the SCE 36 may be collocated or mounted together on a single PCBA having a surface area of approximately 15 square inches or less in one embodiment. The PIM 34 may be adapted for converting a DC link voltage to the applicable excitation waveforms for the particular joint motor being controlled. In another embodiment, the joint processor 32 may be adapted for controlling the torque output (arrow $T_O$) of a given motor 40 positioned within or close to each joint of the robot 10. The PCBA 30 has a high power density and high processing power. In one embodiment, the steady-state power density of the PCBA 30 is approximately 130 W/in$^2$, with a peak of approximately 400 W/in$^2$.

The joint processor 32 may include an integrated circuit in the form of a field-programmable gate array (FPGA). In one embodiment, the FPGA may include a pair of PowerPC or other suitable processor modules resident in the FPGA, e.g., 300 MHz or greater processing speed, floating point capable, and with at least 512 MB of non-volatile memory and at least 64 MB of volatile memory. The processor modules may be either hardcore or softcore, as those terms are understood in the art.

Also as will be understood by those of ordinary skill in the art, an FPGA is an integrated circuit that includes a two-dimensional array of general-purpose logic circuits called "cells" or "logic blocks" whose functions are programmable. The FPGA may include configurable logic blocks (CLB), input/output (I/O) blocks, programmable interconnects, etc. The CLB may be programmed to perform as a specific combinational or sequential circuit. Each CLB may include a block of configurable logic elements (CLE) and corresponding programmable routing resources.

The brainstem/high-level control circuit 31 is in communication with the PCBA 30 over the high-speed bus 35. Precise joint-level control of a given joint motor 40, i.e., control of the torque output (arrow $T_O$) of any DOF of a particular joint by the PCBA 30, may be locally performed aboard each PCBA for its designated DOF at a relatively high feedback loop rate of approximately 10 KHz to approximately 30 KHz or more, thus reserving high-level Cartesian space and impedance-based joint coordination and control for execution by the brainstem/circuit 31. Data output (arrow 48) from the control circuit 31 to each of the PCBA 30 may remain at a lower rate of approximately 400 Hz or less without unduly degrading motor torque control functionality. That is, processing power aboard the brainstem/circuit 31 is freed up by pushing localized joint control to the embedded joint-level processors, such as the individual PCBA 30 embedded in the arms 16 or torso 14 of the robot 10 shown in FIG. 1.

Sensors 38 such as resolvers, angle sensors, etc. may be electrically connected to the joint motor 40 and configured to measure the angular position of a rotor portion of the motor and/or spring deflection if used in a series elastic actuator, and to transmit sensory data (arrow 42) in analog form to an analog-to-digital (A-to-D) converter 33 also positioned aboard the joint-level controller or PCBA 30. Torque output (arrow $T_O$) of the motor 40 may be relayed to the PCBA 30 as feedback for processing by the joint processor 32. A torque command (arrow $T_C$) may be transmitted by the PCBA 30 to the motor 40 in a control loop having a sufficiently high-rate, which may be approximately 10 KHz to approximately 30 KHz according to one embodiment as noted above.

As will be recognized by those of ordinary skill in the art, conventional robotic control systems may use a central processor to control multiple axes for full Cartesian control, position control, and robot sensor processing. A central processor may receive packets of information from an FPGA commutator representing an accumulated relative shaft position of a motor. Using this information, the central processor ordinarily executes position control routines for each of the many different axes, performing Cartesian calculations, and processing other sensory data as required. This configuration may result in a relatively low motor control loop rate, e.g., approximately 400 Hz.

Therefore, in part to maximize the control loop rate for control of the joint motor 40, the present control system 24 separates high-level and low-level control functionality, and utilizes the high-speed serialized bus 35 to enable a high rate of data transfer. The low-level control in each robotic joint consists of a motor torque loop as opposed to only a commutation command to the motor 40. The torque command is processed by the joint processor 32 at the joint level, with the joint processor being collocated with each joint.

Additionally, the PIM 34 may be collocated with the processor 32 on the PCBA 30, thus increasing noise immunity of the overall system architecture. Sensor data is processed locally aboard the PCBA 30 rather than globally by the high-level control circuit 31, potentially resulting in minimized cabling to and from each control node. Therefore, since more data is transferable between the brainstem/control circuit 31 and the respective node being controlled, high-speed serialization protocol may be implemented.

While the best modes for carrying out the invention have been described in detail, those familiar with the art to which this invention relates will recognize various alternative designs and embodiments for practicing the invention within the scope of the appended claims.

The invention claimed is:

1. A control system for use with a robot having a plurality of joints each driven by at least one motor, the control system comprising:
a top-level controller configured to generate task-based control input signals to thereby command execution of a required task;
a brainstem configured to process the task-based control signals to thereby determine which of the joints to activate to execute the required task, and to coordinate the motion of the activated joints; and
a joint-level controller in communication with the brainstem and having a plurality of printed circuit board assemblies (PCBAs), wherein each PCBA includes a joint processor and a high-speed bus providing a calibrated data transfer rate between itself and the brainstem;
wherein each PCBA is configured to control a torque output of the at least one motor only of a corresponding one of the joints using a high-speed feedback torque control loop of at least approximately 10 KHz, and wherein the brainstem provides both Cartesian space control and impedance-based control of the robot without also controlling the torque output.

2. The control system of claim 1, wherein the joint-level controller includes a plurality of position sensors configured to determine a position and torque of the joints as respective analog signals, and wherein each PCBA includes a converter chip configured to convert the analog signals to corresponding digital signals, and to communicate the digital signals to the joint processor.

3. The control system of claim 1, wherein each PCBA is embedded within the robot and collocated with the joint being controlled by that particular PCBA.

4. The control system of claim 1, wherein the joint processor includes a field-programmable gate array (FPGA).

5. The control system of claim 4, wherein the FPGA includes a plurality of processing chips, and wherein the PCBA has a steady-state power density of approximately 130 W/in$^2$ to approximately 400 W/in$^2$.

6. A printed circuit board assembly (PCBA) for controlling the torque output of a motor-driven joint in a robot, the robot having a control circuit adapted for providing both Cartesian control and impedance-based control of the robot without also controlling the torque output, the PCBA comprising:
a joint processor; and
a high-speed bus providing a calibrated data transfer rate between the PCBA and a brainstem;
wherein the motor-driven joint is driven by at least one joint motor, and wherein the PCBA is configured to provide feedback-based torque control of the at least one joint motor in a control loop of at least approximately 10 KHz, and to receive data output from the brainstem at a rate of less than approximately 400 Hz, wherein the data output describes the Cartesian control and the impedance-based control.

7. The PCBA of claim 6, wherein the PCBA has a steady-state power density of approximately 130 W/in$^2$ to approximately 400 W/in$^2$.

8. The PCBA of claim 6, further comprising a power inverter module (PIM) for converting a DC link voltage into excitation waveform usable by the at least one joint motor.

9. The PCBA of claim 6, further comprising sensor conditioning electronics (SCE) adapted for processing a set of signals describing at least a position of a motor of one of the motor-driven joints.

10. The PCBA of claim 6, wherein the PCBA is collated with a corresponding one of the motor-driven joints.

11. The PCBA of claim 6, wherein the PCBA includes a field-programmable gate array (FPGA) with a plurality of onboard processors each having a processing speed of at least 300 MHz.

12. The PCBA of claim 11, wherein the PCBA is floating-point capable, and wherein the PCBA also includes at least 512 MB of non-volatile memory and at least 64 MB of volatile memory.

13. The PCBA of claim 6, wherein the high-speed bus is a serialized bus configured for serializing a stream of output data, and for communicating the stream of data to the control circuit at the calibrated data transfer rate.

14. A robot comprising:
a plurality of joint motors;
a plurality of motor-driven joints each being driven by at least one of the joint motors; and
a control system having:
a top-level controller that generates task-based control input signals to command execution of a required task involving some of the joint motors;
a brainstem configured to process the task-based control signals to thereby determine which of the joints to activate to execute the required task, and to coordinate the motion of the activated joints; and
a joint-level controller in communication with the brainstem and having plurality of printed circuit board assemblies (PCBAs) each including a processor and a high-speed bus, the bus providing a calibrated data transfer rate between the PCBA and brainstem of less than approximately 1 KHz;
wherein each PCBA is configured to control a torque output of at least one of the joint motors and all degrees of freedom only of a corresponding one of the joints using a feedback control loop of at least approximately 10 KHz, and wherein the brainstem provides both Cartesian control and impedance-based control of the robot at the calibrated data transfer rate without also controlling the torque output.

15. The robot of claim 14, further comprising a position sensor configured for determining a position of the motor as an analog signal, wherein each PCBA includes a converter chip that converts the analog signal to a digital signal, and that communicates the digital signal to the joint processor.

16. The robot of claim 14, wherein each PCBA is positioned within the joint that is being controlled by the PCBA.

17. The robot of claim 14, wherein the processor includes a field-programmable gate array (FPGA).

18. The control system of claim 1, wherein the brainstem has a data output rate of less than approximately 400 Hz.

19. The robot of claim 14, wherein the robot has at least 40 degrees of freedom (DOF), and wherein each PCBA controls all of the DOF of only one of the joints.

* * * * *